United States Patent [19]

Hertz

[11] 4,168,519

[45] Sep. 18, 1979

[54] CAPACITOR WITH TIN-ZINC ELECTRODES

[75] Inventor: Jerome J. Hertz, Erie, Pa.

[73] Assignee: Erie Technological Products Inc., Erie, Pa.

[21] Appl. No.: 845,344

[22] Filed: Oct. 25, 1977

Related U.S. Application Data

[62] Division of Ser. No. 725,958, Sep. 23, 1976, Pat. No. 4,130,854.

[51] Int. Cl.² .............................................. H01G 1/01
[52] U.S. Cl. ................................. 361/304; 106/1.22; 361/305; 361/321; 252/512; 427/79; 427/123
[58] Field of Search ................. 427/79, 123, 88, 96; 252/512; 106/1.22; 361/304, 305, 321; 75/175 R

[56] References Cited

U.S. PATENT DOCUMENTS

| 67,491 | 8/1867 | Brayton | 75/175 R |
|---|---|---|---|
| 529,620 | 11/1894 | Inch | 75/175 R |
| 549,610 | 11/1895 | Ramage | 75/175 R |
| 3,784,407 | 1/1974 | Shiio et al. | 252/512 |
| 3,872,360 | 3/1975 | Sheard | 361/305 |
| 3,880,777 | 4/1975 | Shibata | 252/512 |
| 3,904,555 | 9/1975 | Matsuda et al. | 252/512 |
| 3,925,110 | 12/1975 | Prematta et al. | 75/175 R X |
| 4,079,156 | 3/1978 | Youtsey et al. | 427/96 |

*Primary Examiner*—Harris A. Pitlick
*Attorney, Agent, or Firm*—Ralph Hammar

[57] ABSTRACT

A capacitor having electrodes consisting essentially of 65-95 parts tin and 35-5 parts zinc.

2 Claims, 2 Drawing Figures

CAPACITOR WITH TIN-ZINC ELECTRODES

This is a division of Application Ser. No. 725,958 filed Sept. 23, 1976 now U.S. Pat. No. 4,130,854.

Capacitors with dielectrics of barium titanate have been made with electrodes of fired in silver paint consisting essentially of a pigment of silver, a frit for adhering the silver to the ceramic, ingredients for promoting solderability and an inert or indifferent vehicle which is eliminated during firing. After painting the electrode patterns on the dielectric, firing in air at a temperature of about 1500 degrees F. (816 degrees C.) eliminates the vehicle and fuses the frit to the ceramic and to the silver thereby producing the finished electrodes.

This invention eliminates the silver, the solderability promoting ingredient and the frit and substitutes a non-noble metallic pigment of tin, nickel, zinc and produces electrodes which are the functional equivalent of the silver electrodes. The frit is not needed. The non-noble pigment has the necessary adherence. A small amount (2–15%) of frit may be added for additional adherence. No change is necessary in the processing heretofore used for producing silver electrodes.

Figure 1:
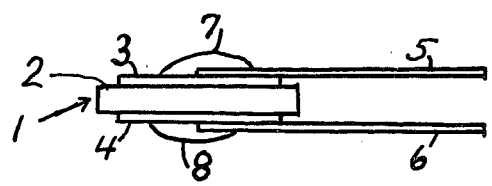
Figure 2:
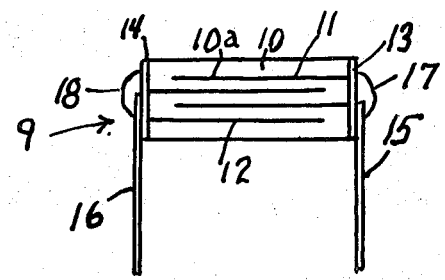

FIGS. 1 and 2 represent uses of the metallization of the application.

In the drawing,

FIG. 1 is an edge view of a ceramic disc capacitor having metallizations providing the electrodes, and FIG. 2 is a diagramatic view of a monolithic capacitor.

The disc capacitor 1 is an exemplar of devices in which metallizations may be used. The term "metallization" as used herein refers to a powder of pigment sized particles which may be dispersed in an inert liquid vehicle to form a "metallizing composition". The latter is useful to print desired electrode patterns on dielectric substrates which, upon firing, produce conductors. It comprises a dielectric 2 of barium titanate or the like, electrodes 3,4 fired on the dielectric and in capacity relation to each other through the dielectric and leads 5,6 soldered or otherwise mechanically and electrically bonded to the electrodes as indicated at 7,8. The leads 5,6 must withstand a pull test.

The multilyer capacitor of FIG. 2 has a plurality of layers 10 of green ceramic on each of which is painted an electrode pattern 10a extending to one edge and margined from other edges. In stacking, alternate layers are turned end for end so that in the completed capacitor there are electrodes 11,12 in capacity relation to each other and respectively extending to end terminations 13,14 which are electrically and mechanically connected to leads 15,16 by solder 17,18.

After stacking the green layers the stack is fired to eliminate binders, etc in the green ceramic and vehicle in the paint and to produce a sintered monolith with embedded electrodes.

EXAMPLE I

In Example 1 after the dielectric has been fired, the electrodes 3,4 are applied as patterns of paint of pigment size particles of tin (melting point about 232° C.) and zinc (melting point 419.4° C.) dispersed or suspended in a vehicle of inert or indifferent material which does not react with the pigment particles or the ceramic.

The size of the pigment particles of tin and zinc should be small so that the particles make conductive contact with each other. There is no advantage in particles of diameter smaller than one micron. Particles of diameter greater than 40 microns may not make the desired electrical contact with each other.

In a tin-zinc pigment system, preferred proportions by weight are 65–95% tin and 35–5% zinc. Preferably the tin particles which are the major component of the paint range from one to forty microns in diameter and the zinc particles range from one to twenty microns in diameter. The zinc and tin particles are ball milled together in any suitable inert or indifferent vehicle previously used for silver paint and the paint is applied by silk screening or by any of the other methods previously used for the silver paint. After the application of the electrode patterns, the paint is fired on in air at a temperature in the range of 1000°–1450° F. (539°–788° C.). At temperatures below 1000° F., the particles of tin and zinc have poor contact with the ceramic and high losses and low capacitance are obtained. At temperatures above 1450° F., the conductivity of the electrode is excessively reduced by oxidation of the particles. Within the 1000°–1450° F. range the tin and zinc particles are sintered together forming a new compound of good conductivity and adherence to the ceramic. Prior to the sintering, the characteristic X-ray diffraction spectral lines of tin and zinc can be observed. After the sintering, new spectral lines appear. Also, and unexpectedly, the tin and zinc particles without any frit are bonded to the ceramic as tightly as the prior art frit containing silver paint. This takes place without any adverse reaction between the pigment particles and the ceramic.

The bonding of the Tin-Zinc pigment to the ceramic is surprising. Tin or Zinc particles alone will not bond to the ceramic. Nor will Tin-Lead solders bond to ceramic. Nor will noble metals stick to the ceramic. The combination of Tin and Zinc apparently forms an alloy which either wets the ceramic or has a surface reaction with the ceramic which forms a bond. This is the best theory known to date. The dielectric constant of the ceramic as evidenced by the measured capacitance is substantially unchanged. The insulation resistance is slightly less than the same dielectric with silver paint electrodes from which it might be inferred that there had been some dispersion of the pigment particles into the ceramic. Possibly, the more intimate contact obtained by the bonding of the pigment particles to the ceramic without any frit, and the increase in capacitance which might be expected from the more intimate contact is offset by a slight surface reaction with the ceramic.

The Tin-Zinc electrodes are completely interchangeable with the standard silver electrodes. The variations in properties which appear are within the normal limits of variations for dielectrics with the standard silver electrodes.

The leads may be attached to the electrodes by several methods. First, the electrodes may be copper sprayed and then soldered by solder dip methods. Second, the electrodes may be solder sprayed and the leads attached either by solder reflow or by solder dip. The leads may also be attached by electrically conductive epoxy cement.

The following results were obtained with the Tin-Zinc metallizations:

| Dielectric | K 1200 | K1800 | N0470 | K300 | N2200 |
|---|---|---|---|---|---|
| Capacitance | 3.73nf | 4.9nf | 707pf | 157pf | 858pf |
| D F % | 1.23 | 1.13 | .29 | 1.03 | .19 |
| IR Gohms at 1000 volts | 500 | 500 | 1000 | 500 | 500 |
| RC Ohm farads | 1865 | 2449 | 1.07 | 78.5 | 429 |
| Successful 1000 Hrs. life tests | 2000VDC 85° C. | 1750VDC 85° C. | 2000VDC 85° C. | 3000VDC 85° C. | 1750VDC 85° C. |
| @ 125° C. | 1500VDC @ 125° C. | 1250VDC @ 125° C. | 1000VDC @ 125° C. | 2000VDC @ 125° C. | 750VDC |
| 1000VDC @ 150° C. | | | | | |

The foregoing tests were made on disc capacitors, the capacitors also passed the industry test requirements for disc capacitors.

EXAMPLE II

Another base metal pigment for metallization which replace silver is nickel (melting point 1452° C.). As obtained, for example from nickel carbonyl, the nickel particles have a surface oxide coating which must be removed and replaced by a coating which prevents oxidation. Oxide removal may be accomplished by treatment in acid solutions. A specific acid treatment consists of washing the powder in a water-nitric acid solution from 5-30% by volume nitric acid for a period of 1 to 5 minutes followed by a distilled water rinse followed by a dilute 1-2% by volume sulfuric acid wash followed by a 30 second rinse in distilled water followed by a hot water rinse. The powder is now submerged immediately in a solution of 10 grams sodium borate plus 10 grams ammonium borate in 100 grams of water, the solution decanted and the powder oven dried. The nickel powder now has an extremely thin coating of nickel borate, possibly mono molecular, an oxidation preventing coating. The powder may now be used as the sole pigment of a metallization paint or paste or the powder may be mixed with other base metal pigments such as tin or zinc. The range of proportions is 99-50% nickel powder to 50-1% base metal.

For tin best results are obtained with the addition of 5% or less (95% nickel 5% tin).

For zinc alone or tin zinc mixture, the addition may be up to 50% by weight. (99-50% nickel 50-1% zinc or zinc tin).

The treatment of the nickel powder to form the oxidation resisting coating is important. If the treatment is omitted, air firing at 1400 degrees F. would result in complete oxidation of the nickel.

The nickel pigment is dispersed in the same vehicle and is applied in the same manner as the silver pigment it replaces. For disc capacitors, the paint is applied after the ceramic is fired. For monolithic or multiple layer capacitors having dielectrics which fire in the range of 800 to 900 degrees C. (1472° to 1652° F.) the nickel pigment paint is applied to the green ceramic and the monolith is fired to produce the monolithic capacitor in one step. Barium titanate and other high K dielectrics which fire in the range of 800 to 900 degrees C. are known. Some of these are glass ceramics—special forms of divitrified glass. Others are glass bonded ceramics consisting of high temperature fired ceramic particles bonded by low temperature glass. Others are based on elements related to titanium.

The nickel metallizations may be soldered directly with an active flux such as Kester 1544 or Kester 815. Alternatively, any of the methods previously disclosed for the tin-zinc metallizations may be used. Also the metallization may be nickel plated or gold plated and then soldered directly.

The coated nickel pigment has surprising adhesion to the ceramic. Nickel powder alone will not adhere. The firing temperature is way below the temperature at which nickel particles sinter. The borate coating may form a glass or it may act as a flux which cleans the surfaces of the nickel pigment particles and promotes a diffusion bonding. The boron in the coating may be a replacement for the usual oxide film which forms on nickel. Another theory is that the nickel borate may form a nickel boride compound which is oxidization resistant and conducting. Whatever the theory, the pigment of coated nickel has excellent adherence to the ceramic and is solderable. Neither of these properties would be obtained if the oxidation resistant coating were omitted.

Examples of capacitors with metallization of Nickel pigment on barium titanate dielectrics are given below:

| | Pigment Paint | 100% Nickel 80% Pigment 20% Vehicle | | | | | |
|---|---|---|---|---|---|---|---|
| Dielectric | K9000 | K5000 | K1200 | K1800 | K3900 | N3300 | N0470 |
| Capacitance | 26nf | 15.61nf | 5.74nf | 7.23nf | 4.36nf | .77nf | 6.47nf |
| DF % | 1.77 | 1.52 | 2.27 | 1.45 | .78 | 3.9 | 2.1 |
| K | 9588 | 6781 | 2506 | 2250 | 2221 | 345 | 28.8 |

| | Pigment Paint | 100% Nickel 60% Pigment 40% Vehicle | | |
|---|---|---|---|---|
| Dielectric | K1700 | K3900 | N0470 | N2200 |
| Capacitance | 4.90nf | 5.26nf | .144nf | .39nf |
| DF % | 3.63 | 2.45 | 1.47 | 1.11 |
| K | 1936 | 2737 | 58.4 | 64.5 |

| | Pigment Paint | 100% Nickel 60% Pigment 40% Vehicle |

-continued (Metallization Nickel plated before soldering to leads)

| Dielectric | K9000 | K5000 | K1700 | K1800 | N3300 | K3900 |
|---|---|---|---|---|---|---|
| Capacitance | 17.5nf | 13.2nf | 4.76nf | 6.86nf | 5.38nf | 5.58nf |
| DF % | 1.9 | 2.07 | 5.25 | 1.44 | 1.91 | .97 |
| K | 7808 | 5908 | 1881 | 2503 | 287 | 2904 |

Pigment Paint 100% Nickel
50% Pigment 50% Vehicle
(Metallization Copper sprayed before soldering leads)

| Dielectric | K9000 | K5000 | K1700 | K3900 | N3300 | N0470 | K0300 |
|---|---|---|---|---|---|---|---|
| Capacitance | 23.9nf | 12.71nf | 8.31nf | 5.0nf | 6.67nf | .147nf | .202nf |
| DF % | 2.45 | 1.91 | 2.45 | 1.73 | .29 | 1.18 | .74 |
| K | 9200 | 5751 | 3196 | 3167 | 299 | 59.6 | .347 |

Pigment Paint 62½% Ni 37½% Zinc
80% Pigment 20% vehicle

| Dielectric | K 5000 | K 9000 | N3300 | N0470 |
|---|---|---|---|---|
| Capacity | 10.8nf | 16.9nf | 589pf | 108pf |
| DF % | .59 | 1.72 | .195 | .61 |
| IR G ohms @ 1000 volts | 194 | 154 | 765 | 184 |
| RC ohn farads | 2095 | 2603 | 451 | 1,98 |
| Successful life test 1000 hour | 1750VDC @ 85 C | 1000VDC @ 85 C | 1500VDC @ 85 C | 1000VDC @85 C |
| | 1000VDC @ 125 C | 750VDC @ 125 C | 750VDC @ 125 C | |

Pigment Paint 60% Zinc 40% Nickel
80% pigment 20% Vehicle

| Dielectric | K9000 | K5000 | K1200 | K1800 | K3900 | K0300 | N0470 | N2200 | N3300 |
|---|---|---|---|---|---|---|---|---|---|
| Capacitance | 16.4nf | 10.6nf | 3.99nf | 5.08nf | 4.82nf | .186nf | .113nf | .991nf | .562nf |
| IF % | 1.23 | 1.29 | 4.48 | 2.59 | 3.63 | 1.87 | .70 | 1.35 | .30 |
| K | 5807 | 3286 | 1576 | 2197 | 2503 | 319 | 59.3 | 162 | 311 |

The approximate composition of dielectrics listed above are:

| | BaTiO$_3$ | CaTiO$_3$ | BiTiO$_3$ | Minor Constituents |
|---|---|---|---|---|
| K 9000 | 88% | 11% | | 1% Bismuth, Zinc Oxides |
| K 5000 | 87% | 12% | | 1% Fe$_2$O$_3$ |
| K 1200 | 84% | | | 11% Bismuth Stannate 5% Calcium, Cobalt, Magnesium |
| K 1800 | 93% | | 5% | 2% Tantalum & Rare Earth |
| K 3900 | 70% | 25% | | 5% Rare Earth |
| KO 300 | 70% | 10% | | 10% Strontium Titanate 10% Rare Earth |
| N 3300 | 70% | 30% | | Trace Rare Earth |
| NO 470 | 99% | | | 1% Rare Earth |
| N 2200 | 65 | 35 | | Trace Rare Earth |
| K 1700 | | | | 90% SrTiO$_3$ plus 10% minor constituents |

What is claimed is:

1. A capacitor having one or more electrodes of a metallization of finely divided non-noble metals consisting essentially of by weight 65-95 parts tin and 35-5 parts zinc.

2. A disc capacitor having a sintered ceramic dielectric with electrodes of a metallization of finely divided non-noble metals consisting essentially of by weight 65-95 parts tin and 35-5 parts zinc.

* * * * *